United States Patent [19]

Fullam

[11] Patent Number: 5,764,291
[45] Date of Patent: Jun. 9, 1998

[54] APPARATUS AND METHOD FOR ORIENTATION-DEPENDENT CAMERA EXPOSURE AND FOCUS SETTING OPTIMIZATION

[75] Inventor: Scott F. Fullam, Santa Clara, Calif.

[73] Assignee: Apple Computer, Inc., Cupertino, Calif.

[21] Appl. No.: 316,560

[22] Filed: Sep. 30, 1994

[51] Int. Cl.$^6$ .......................... H04N 5/235; G03B 37/00
[52] U.S. Cl. ...................... 348/362; 348/348; 396/50
[58] Field of Search ................... 348/362, 363, 348/364, 365, 221, 224, 228, 345, 349, 353, 207; 354/31, 410; 396/50; 33/334, 366, 382

[56] References Cited

U.S. PATENT DOCUMENTS

| 4,172,327 | 10/1979 | Kuehn et al. | 33/366 |
| 4,364,650 | 12/1982 | Terashita et al. | 354/31 |
| 4,466,230 | 8/1984 | Osselaere et al. | 56/10.2 |
| 4,574,319 | 3/1986 | Konishi | 358/335 |
| 4,623,930 | 11/1986 | Oshima et al. | 358/222 |
| 5,083,383 | 1/1992 | Heger | 33/366 |
| 5,093,716 | 3/1992 | Kondo et al. | 348/224 |
| 5,122,827 | 6/1992 | Saegusa et al. | 354/410 |
| 5,144,358 | 9/1992 | Tsuru et al. | 396/50 |
| 5,302,997 | 4/1994 | Cocca | 396/99 |
| 5,343,246 | 8/1994 | Arai et al. | 348/363 |
| 5,373,153 | 12/1994 | Cumberledge et al. | 250/231.1 |

FOREIGN PATENT DOCUMENTS 0519379  12/1992  European Pat. Off. ......... H04N 7/18

Primary Examiner—Andrew I. Faile
Assistant Examiner—Andrew B. Christensen
Attorney, Agent, or Firm—Fenwick & West LLP

[57] ABSTRACT

An orientation sensor generates a left orientation signal and a right orientation signal to indicate whether a camera is in an upright orientation, a left orientation, a right orientation, or an inverted orientation. A setting unit retrieves the left and right orientation signals and light intensity signals corresponding to image measurement zones. Based upon the values of the left and right orientation signals, the setting unit uses different weighted combinations of the light intensity signals to determine optimum exposure and focus settings. The orientation sensor includes a first tube and a second tube that each contain an indicating object. The indicating object within each tube selectively provides two orientation signals based upon the camera's orientation relative to an image, thereby changing an orientation signal from a binary "0" signal to a binary "1" signal.

2 Claims, 7 Drawing Sheets

| R | L | CAMERA ORIENTATION |
|---|---|---|
| 0 | 0 | UP |
| 0 | 1 | LEFT |
| 1 | 0 | RIGHT |
| 1 | 1 | DOWN (INVERTED) |

*FIG. 6*

| ORIENTATION SIGNAL CONDITION | CAMERA ORIENTATION |
|---|---|
| L1 = R1 | UP |
| L1 = L2 | LEFT |
| R1 = R2 | RIGHT |
| L2 = R2 | DOWN (INVERTED) |

*FIG. 7*

APPARATUS AND METHOD FOR ORIENTATION-DEPENDENT CAMERA EXPOSURE AND FOCUS SETTING OPTIMIZATION

BACKGROUND OF THE INVENTION

1. Field of the Invention

The present invention relates generally to systems and methods for automatically determining camera exposure and focus settings. More particularly, the present invention is an apparatus and method for orientation-dependent camera exposure and focus setting optimization.

2. Description of the Background Art

Both still and video cameras commonly include means for the automatic determination of camera exposure and focus settings. In the prior art, cameras that automatically determine exposure and focus settings typically include one or more sensors that detect light intensity in one or more measurement zones within an image and output a corresponding light intensity signal. Referring now to FIG. 1A, an exemplary set of measurement zones within an exemplary image is shown. As shown in FIG. 1A, the exemplary image contains a tree, the sky, and the ground. The exemplary set of measurement zones includes a first and a second measurement zone in which light is detected and measured, respectively labeled A and B. Each of the exemplary measurement zones corresponds to a predetermined region within the exemplary image. The positioning of the measurement zones and the use of the data produced from them is typically optimized for a standard upright orientation of the camera and portions of the image that are most-likely to be of interest. Those skilled in the art will readily recognize that the set of measurement zones can be defined in a different manner than that shown.

Prior art apparatus and methods typically perform predetermined setting calculations using predetermined weighted combinations of light intensity signals to generate exposure and focus settings. The predetermined setting calculations and the use of predetermined weighted combinations of light intensity signals are intended to produce optimum exposure and focus settings and are based upon several assumptions about an image. Typically, a first assumption is that the top portion of an image will be brighter than the bottom portion of the image. In the exemplary image of FIG. 1A, the sky in the top portion of the exemplary image is indeed likely to be brighter than the ground in the bottom portion of the exemplary image. In a like manner, if an image contains a person or object positioned against a background, the top portion of the image, namely, that portion of the image containing the person's head, is likely to be brighter than the bottom portion of the image.

The predetermined setting calculations thus weight intensity signals generated by those sensors associated with the top portion of the image more strongly than intensity signals generated by the sensors associated with the bottom portion of the image. For example, the predetermined setting calculations might use 75% of the intensity signal obtained from measurement zone A in FIG. 1A, and 25% of the intensity signal obtained from measurement zone B to determine optimum settings for shutter speed, focus, and aperture.

Unfortunately, a constant correlation between any portion of an image and any predetermined subset of measurement zones does not exist because camera orientation can be changed relative to the image. That is, cameras are often rotated by the user to capture a desired image such as a landscape (using a normal or upright camera orientation) or portrait (using an upturned camera orientation). Referring now to FIG. 1B, a block diagram of the exemplary set of measurement zones of FIG. 1 when the camera is rotated 90 degrees relative to its normal orientation is shown. As can be seen in FIG. 1B, measurement zones A and B are in the same position relative to the camera as in FIG. 1A, but are in a very different position relative to the image. Thus, measurement zone A no longer corresponds to the top portion of the image, and measurement zone B no longer corresponds to the bottom portion of the image. Therefore, the predetermined setting calculations described above will produce non-optimal exposure and focus settings for the orientation shown in FIG. 1B.

The automatically-determined exposure and focus settings generated in the prior art are non-optimal when a camera has been rotated relative to an image. What is needed is a means for determining optimum values for exposure and focus settings regardless of camera orientation.

SUMMARY OF THE INVENTION

The present invention is an apparatus and method for orientation-dependent camera exposure and focus setting optimization. The apparatus of the present invention functions within a still or video camera and comprises a plurality of light sensors, a processing unit, an orientation sensor, and a setting unit. The light sensors each correspond to a predetermined measurement zone within an image, and output a light intensity signal proportional to incident light intensity. The orientation sensor outputs a left orientation signal and a right orientation signal that together indicate whether the camera is in an upright (normal), left, right, or inverted orientation relative to the earth. The setting unit determines optimum exposure and focus settings using the light intensity signals based upon the values of the left and right orientation signals. In a preferred embodiment of the apparatus, four light sensors are present. When the camera is maintained in an upright position, the setting unit preferably treats a first and a second light sensor as corresponding to measurement zones associated with the top of an image, and treats a third and fourth light sensor as corresponding to measurement zones associated with the bottom of the image. When the camera has a right-orientation, the setting unit preferably treats the first and third light sensors as corresponding to measurement zones associated with the top of the image, and treats the second and fourth light sensors as corresponding to measurement zones associated with the bottom of the image. When the camera has a left-orientation, the setting unit preferably treats the second and fourth light sensors as corresponding to measurement zones associated with the top of the image, and treats the first and third light sensors as corresponding to measurement zones associated with the bottom of the image. Finally, when the camera is inverted, the setting unit preferably treats the third and fourth light sensors as corresponding to measurement zones associated with the top of an image, and the first and second light sensors as corresponding to measurement zones associated with the bottom portion of the image. Because the present invention determines the camera's orientation and accordingly modifies the manner in which exposure and focus settings are determined, the present invention ensures that these settings are optimum regardless of the camera's orientation.

BRIEF DESCRIPTION OF THE DRAWINGS

FIG. 6 is a truth table specifying camera orientations relative to the values of a left orientation signal and a right orientation signal;

FIG. 7 is a table specifying camera orientations relative to the values of a first left orientation signal, a second left orientation signal, a first right orientation signal, and a second right orientation signal;

DETAILED DESCRIPTION OF THE PREFERRED EMBODIMENTS

Figure 2A:
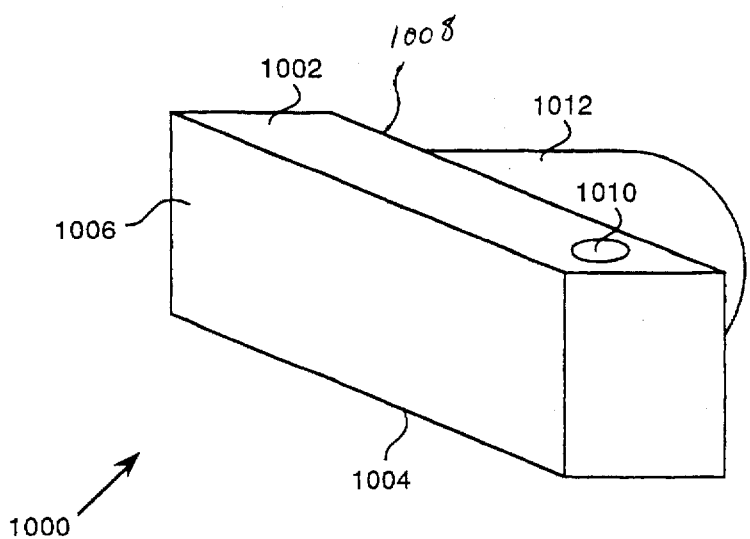
FIG. 2A is a perspective view of a camera.

Referring now to FIG. 2A, a perspective view of a camera 1000 is shown. The camera has a generally rectangular shape, and includes a top 1002, a bottom 1004, a back 1006, and a front 1008. A generally cylindrical portion 1012 of the camera housing 1000 extends forward from the front 1008 and holds a lens (not shown) that is used to capture an image. The camera's top 1002 and bottom 1004 are each parallel to the plane defined by the surface of the earth when the camera 1000 is in its normal operational mode and is not rotated. The camera's back 1006 is perpendicular to the top 1002 and the bottom 1004. The camera 1000 in FIG. 2A is a conventional single-lens-reflex (SLR) camera, and has a shutter button 1010 on its top 1002. The camera 1000 also includes conventional electronics for providing automatic focus and exposure control of the shutter, aperture, and lens. Those skilled in the art will recognize that the camera 1000 could in general be of any type, including but not limited to a video camera.

Figure 2B:
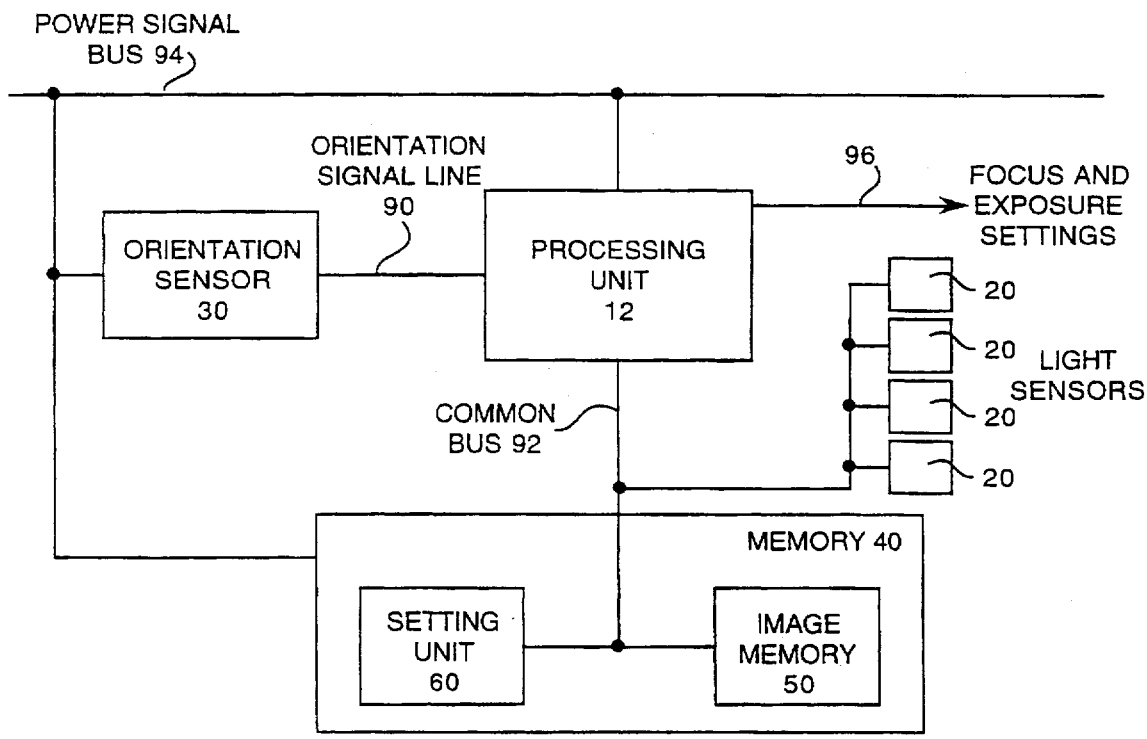
FIG. 2B is a block diagram of a preferred embodiment of an apparatus for orientation-dependent camera exposure setting adjustment constructed in accordance with the present invention.

Referring also now to FIG. 2B, a block diagram of a preferred embodiment of an apparatus 10 for orientation-dependent camera exposure and focus setting optimization constructed in accordance with the present invention is shown. The apparatus 10 functions within the camera 1000 of FIG. 2A, and comprises a processing unit 12 having at least one orientation input, at least one setting output, and a bidirectional communication port; a plurality of light sensors 20, each light sensor 20 having an optical signal input and an output, and generating a light intensity signal proportional to a detected light intensity; an orientation sensor 30 having at least one orientation output; and a memory 40 having an input and an output wherein an image memory 50 and a setting unit 60 are stored. Each orientation output of the orientation sensor 30 is coupled to a corresponding orientation input of the processing unit 12 via an orientation signal line 90. The bidirectional communication port of the processing unit 12 the input and the output of the memory 40, and the output of each light sensor 20 are coupled via a common bus 92. Each of the processing unit's setting outputs are coupled to a corresponding focus or exposure actuator within the camera 1000 via a setting control line 96. The processing unit 12, each light sensor 20, the orientation sensor 30, and the memory 40 additionally each have a power input coupled to a power signal bus 94. Preferably, the power signal bus 94 is coupled to a power source within the camera, and provides both a positive and a relative electrical ground voltage value. In an exemplary embodiment, the apparatus 10 is a Canon EOS 2e SLR camera having the orientation sensor 30 and the setting unit 60 of the present invention.

Each light sensor 20 is preferably a conventional optoelectronic light detector. In response to a light signal received at its optical signal input, a light sensor 20 produces a light intensity signal proportional to the intensity of the received light signal. Each light sensor 20 preferably corresponds to a predetermined measurement zone within an image.

When a camera user wants to take a picture, the user depresses the camera's shutter button 1010. The depression of the camera's shutter button 1010 results in the generation of a shutter activation signal in a conventional manner. In response to the shutter activation signal, the processing unit 12 stores each light intensity signal and each orientation signal at predetermined locations in the image memory 50, after which the processing unit 12 issues a setting calculation signal to the setting unit 60. In response to a completion signal received from the setting unit 60, the processing unit 12 retrieves optimum exposure and focus settings from predetermined memory locations, and transfers each exposure and focus setting to an appropriate setting actuator within the camera 1000 in a conventional manner.

The setting unit 60 retrieves light intensity and orientation signals from the memory 40, and determines optimum exposure and focus settings based upon the values of the orientation signals as will be described in detail below with respect to each of a first, second, and third embodiments of the orientation sensor 30. Upon completing the determination of the exposure and focus settings, the setting unit 60 stores the exposure and focus settings at predetermined memory locations, and issues a completion signal to the processing unit 12. In the preferred embodiment, the setting unit 60 comprises a sequence of computer program steps stored in the memory 40 and executable by the processing unit 12. Those skilled in the art will recognize that in an alternate embodiment, the setting unit 60 could be implemented as dedicated hardware.

Figure 3A:
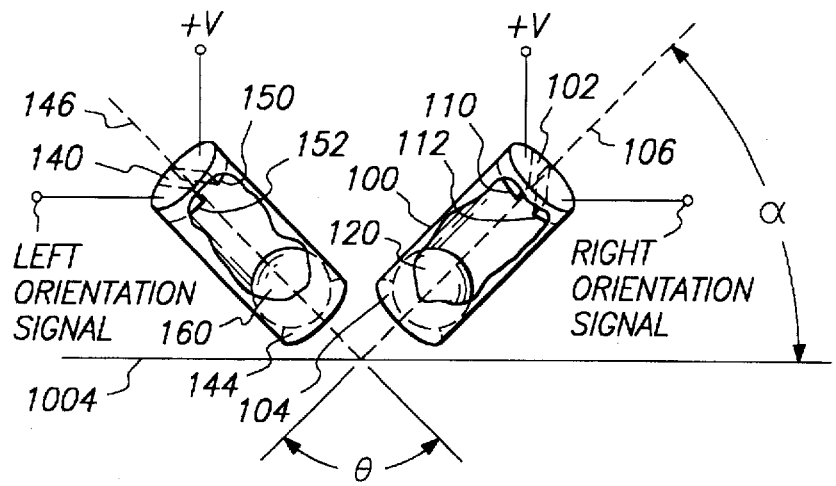
FIG. 3A is a perspective view of a first embodiment of an orientation sensor of the present invention in a normal orientation.
Figure 3B:
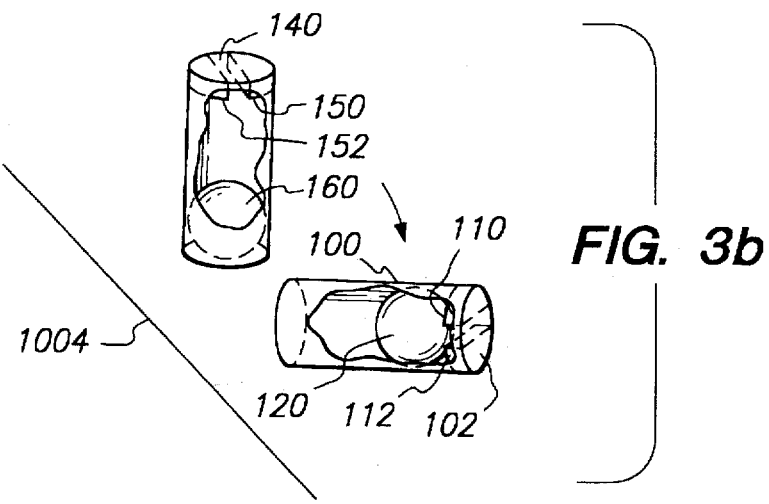
FIG. 3B is a perspective view of the orientation sensor of FIG. 3A after a clockwise rotation of the camera by an angle having a magnitude slightly greater than α degrees.

Referring now to FIGS. 3A and 3B, a perspective view of a first embodiment of the orientation sensor 30 is shown. In the first embodiment, the orientation sensor 30 comprises a first tube 100 having a first end 102, a second end 104, and a longitudinal axis 106; a first electrical contact 110; a second electrical contact 112; a first conducting ball 120; a second tube 140 having a first end 142, a second end 144, and a longitudinal axis 146; a third electrical contact 150; a fourth electrical contact 152; and a second conducting ball 160. The first and second tubes 100, 140 are each hollow. The first electrical contact 110 is placed over a portion of the first end 102 of the first tube 100, and is electrically coupled to the orientation sensor's power input to preferably provide a voltage of V volts. The second electrical contact 112 is also placed over a portion of the first tube's first end 102, proximate to but electrically isolated from the first electrical contact 114. The second electrical contact 112 is resistively coupled to electrical ground. The second electrical contact 112 forms a right orientation output of the orientation sensor 30 that provides a right orientation signal to a right orientation input of the processing unit 12 via an electrical coupling to the orientation signal line 90. The first conducting ball 120 is placed within the first tube 100, and is free to move between the first and second ends 102, 104 of the first tube 100.

In a manner analogous to that for the first tube 100, the third electrical contact 150 is placed over a portion of the first end 142 of the second tube 140, and is electrically coupled to the orientation sensor's power input to preferably provide a voltage of V volts. The fourth electrical contact 152 is also placed over a portion of the first end 142 of the first tube 140, proximate to but electrically isolated from the third electrical contact 154. The fourth electrical contact 152 is resistively coupled to electrical ground. The fourth electrical contact 152 forms a left orientation output of the orientation sensor 30 that provides a left orientation signal to a left orientation input of the processing unit 12 via the orientation signal line 90. The second conducting ball 122 is placed within the second tube 140, and is free to move between the second tube's first and second ends 142, 144.

Both the longitudinal axis 106 of the first tube 100 and the longitudinal axis 146 of the second tube 140 preferably lie within a plane that is parallel to the back 1006 of the camera 1000. The longitudinal axis 106 of the first tube 100 is oriented at an angle α relative to the plane containing the bottom 1004 of the camera 1000. The longitudinal axis 146 of the second tube 140 is oriented at an angle θ relative to the longitudinal axis 106 of the first tube 100. In the preferred embodiment, α is about 45 degrees, and θ is about 90 degrees. Herein, it is assumed that the longitudinal axis 146 of the second tube 140 is also oriented at an angle α relative to the bottom 1004 of the camera. Those skilled in the art will recognize that in alternate embodiments, α and/or θ could have different values.

When the camera 1000 is not rotated, that is, when the camera's top 1002 and bottom 1004 are parallel to the plane of the surface of the earth, the first conducting ball 120 rests upon the second end 104 of the first tube 100, and the second conducting ball 160 rests upon the second end 144 of the second tube 140. No current flows between the first and second electrical contacts 110, 112, and no current flows between the third and fourth electrical contacts 150, 152. Therefore, the right and left orientation signals each have a value of zero volts.

Once the camera 1000 is rotated in a clockwise manner past an angle having a magnitude greater than α, the first conducting ball 120 rolls away from the second end 104 of the first tube 100, and comes to rest against the first end 102 of the first tube 100, thereby electrically coupling the first electrical contact 110 and the second electrical contact 112. Referring also now to FIG. 3B, a perspective view of the first embodiment of the orientation sensor 30 after a clockwise camera rotation slightly past an angle having a magnitude greater than α is shown to aid understanding. Because the first electrical contact 110 is coupled to the orientation sensor's power input, the right orientation signal now equals V volts. Meanwhile, the second conducting ball 160 still rests against the first end 142 of the second tube 140, and the left orientation signal remains at zero volts.

As the camera 1000 is further rotated in a clockwise direction, the first conducting ball 120 remains in contact with the first end 102 of the first tube 100, and the second conducting ball 160 remains in contact with the second end 144 of the second tube 140 until the camera 1000 has been rotated past an angle having a magnitude of (α+θ) degrees. When the camera 1000 has been rotated slightly past an angle having a magnitude of (α+θ) degrees, the second conducting ball 160 travels away from the second end 144 of the second tube 140, and comes to rest upon the third and fourth electrical contacts 152, 152. Because the third and fourth electrical contacts are now electrically coupled via the second conducting ball 160, the left orientation signal equals V volts. The right orientation signal remains unchanged at this point, equal to V volts.

Between clockwise camera rotation angles having magnitudes greater than (α+θ) degrees but less than (α+2θ) degrees, both the right and left orientation signals equal V volts. Once the camera 1000 has been rotated in a clockwise direction slightly past an angle having a magnitude larger than (α+2θ) degrees, the first conducting ball 110 moves back to the second end 104 of the first tube 100, therefore causing the right orientation signal to transition to zero volts. The second conducting ball 160 remains at the first end 142 of the second tube 140 at this point, and therefore the left orientation signal remains at V volts.

Between clockwise camera rotation angles having magnitudes greater than (α+2θ) degrees but less than (α+3θ) degrees, the left orientation signal equals V volts and the right orientation signal equals zero volts. Once the camera 1000 has been rotated clockwise just past an angle having a magnitude of (α+3θ) degrees, the second conducting ball 160 moves back to the second end 144 of the second tube 140, and the left orientation signal thus transitions to zero volts. The right orientation signal remains at zero volts. Considering further clockwise camera rotation, both the left and right orientation signals equal zero volts until the camera 1000 is again rotated past an angle having a magnitude larger than α degrees.

Those skilled in the art will readily comprehend the behaviors exhibited by the first and second conducting balls 120, 160 and therefore the respective values of the right and left output signals relative to counterclockwise camera rotations. For counterclockwise camera rotation angles having magnitudes between zero degrees and α degrees, the left and right orientation signals each have values of zero volts. Counterclockwise camera rotation angles having magnitudes larger than a degrees and up to (α+θ) degrees produce a left orientation signal having a value of V volts and a right orientation signal having a value of zero volts. For counterclockwise camera rotation angles having magnitudes greater than (α+θ) degrees but less than (α+2θ) degrees, both the left and right orientation signals have values of V volts. Those counterclockwise camera rotation angles having magnitudes in excess of (α+2θ) degrees but less than (α+3θ)

degrees result in the right orientation signal having a value of V volts, and the left orientation signal having a value of zero volts. Finally, counterclockwise camera rotation angles having magnitudes larger than (α+3θ) degrees result in both the left and right orientation signals having values of zero volts, until the camera is rotated in a counterclockwise direction past an angle having a magnitude greater than a degrees as indicated above.

As previously described, the processing unit 12 preferably stores the values of the right and left orientation signals at predetermined locations in the image memory 50 in response to the shutter activation signal. In response to the setting calculation signal, the setting unit 60 retrieves the values of the left and right orientation signals and determines whether the camera 1000 is in an upright orientation, a right orientation, a left orientation, or an inverted orientation. The setting unit 60 preferably treats an orientation signal value of V volts as a binary "1" signal, and an orientation signal value of zero volts as a binary "0" signal. Referring now to FIG. 6, a truth table specifying camera orientations for combinations of left and right orientation signal values is shown. As given by the truth table, when the right and left orientation signals each correspond to a binary "0" signal, the setting unit 60 determines that the camera 1000 is in an upright orientation. When the left orientation signal corresponds to a binary "1" signal and the right orientation signal corresponds to a binary "0" signal, the setting unit 60 determines that the camera 1000 is in a left orientation. Similarly, the setting unit 60 determines that the camera 1000 is in a right orientation when the right orientation signal corresponds to a binary "1" signal and the left orientation signal corresponds to a binary "0" signal. Finally, the setting unit 60 determines that the camera is in an inverted orientation when both the left and right orientation signal values correspond to a binary "1" signal.

Figure 1A:
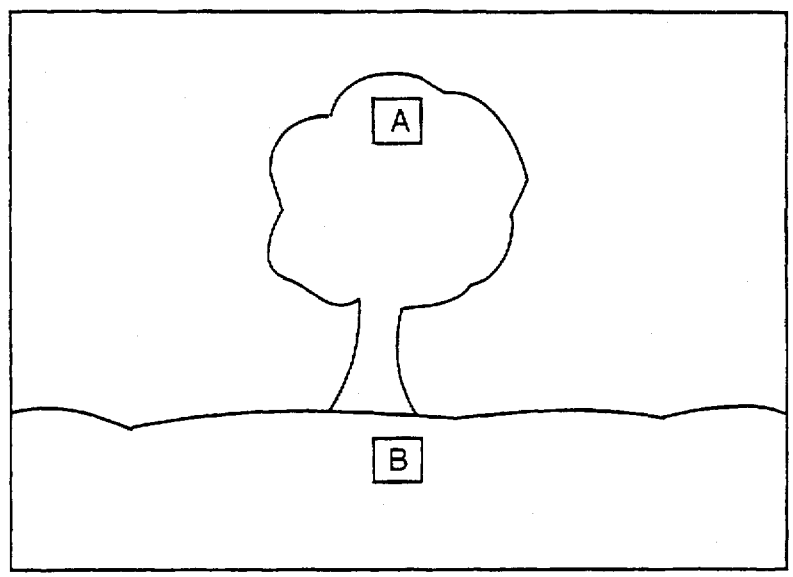
FIG. 1A is a graphical representation of an exemplary image and an exemplary set of measurement zones used by a camera in its normal orientation.
Figure 1B:
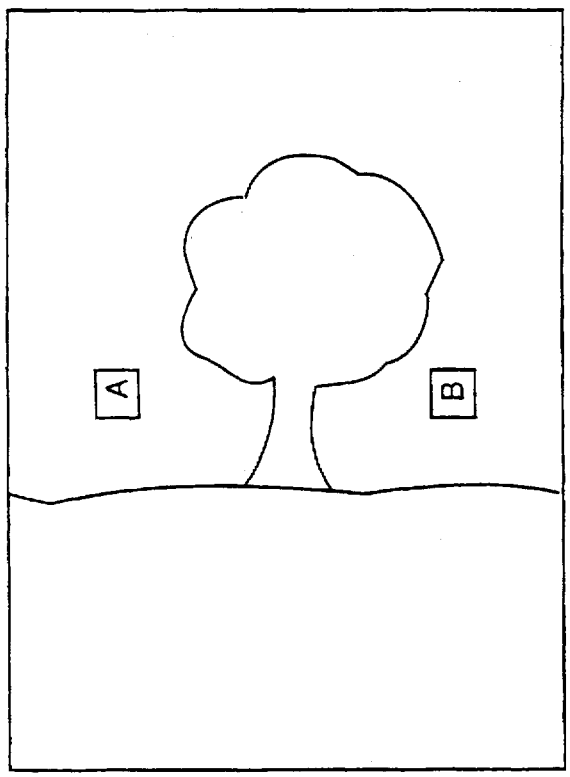
FIG. 1B is a graphical representation of the exemplary image and the exemplary set of measurement zones when the camera orientation is rotated 90 degrees with respect to the exemplary image of FIG. 1A.
Figure 9A:
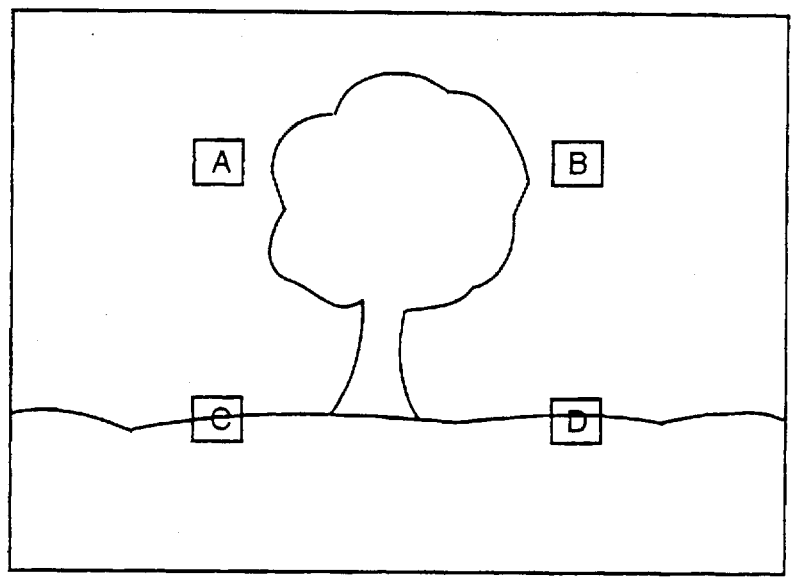
FIG. 9A is a graphical representation of the exemplary image of FIG. 1A and an preferred set of measurement zones used by a camera in its normal orientation.

Based upon the determined camera orientation, the setting unit 60 modifies the manner in which the light intensity signals are incorporated into the optimum exposure and focus settings. Referring now to FIG. 9A, a graphical representation of the exemplary image of FIG. 1A and a preferred set of measurement zones used by a camera in its normal orientation is shown. The preferred set of measurement zones includes a first measurement zone labeled as A, a second measurement zone labeled as B, a third measurement zone labeled as C, and a fourth measurement zone labeled as D. Measurement zones A, B, C, and D each correspond to a first, second, third, and fourth light sensor 20. As shown in FIG. 9A, when the camera is in an upright or normal orientation, measurement zones A and B correspond to the top portion of the exemplary image, while measurement zones C and D correspond to the bottom portion of the exemplary image.

In response to the setting calculation signal, the setting unit 60 retrieves the light intensity signals associated with measurement zones A, B, C, and D and the left and right orientation signals from the image memory 50. Using the values of the left and right orientation signals, the setting unit next determines whether the camera 1000 is in an upright orientation in the manner described above. If the camera 1000 is in an upright orientation, the setting unit 60 preferably calculates optimum exposure and focus settings by treating the light intensity signals associated with measurement zones A and B as corresponding to the top portion of the image, and the light intensity signals associated with measurement zones C and D as corresponding to the bottom portion of the image.

Figure 9B:
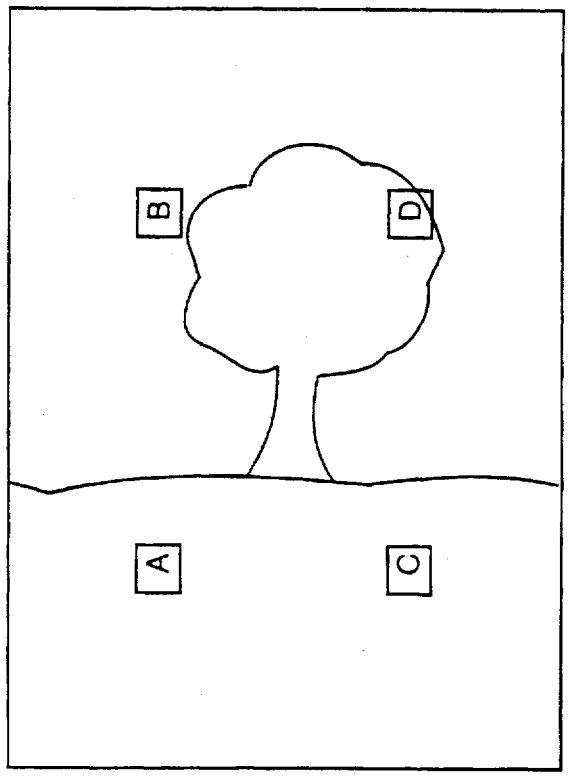
FIG. 9B is a graphical representation of the exemplary image and the preferred set of measurement zones when the camera is rotated 90 degrees in a left-orientation with respect to the exemplary image.

If the camera 1000 is not in an upright orientation, the setting unit 60 next determines whether the camera 1000 is in a left orientation in the manner described above. Referring also now to FIG. 9B, a graphical representation of the exemplary image and the preferred set of measurement zones when the camera is rotated 90 degrees in a left-orientation with respect to the exemplary image is shown. As shown in FIG. 9B, while each of the measurement zones maintains the same orientation with respect to the camera, each of the measurement zones is in a different orientation with respect to the exemplary image when compared to FIG. 9A. Thus, in FIG. 9B, measurement zones B and D correspond to the top portion of the image, and measurement zones A and C correspond to the bottom portion of the image. If the camera 1000 is in a left orientation, the setting unit 60 preferably calculates optimum exposure and focus settings by treating the light intensity signals associated with measurement zones B and D as corresponding to the top portion of the image, and the light intensity signals associated with measurement zones A and C as corresponding to the bottom portion of the image.

In the event that the camera 1000 is not in a left orientation, the setting unit 60 subsequently determines whether the camera 1000 is in a right orientation in the manner previously described. If the camera 1000 is in a right orientation, the setting unit 60 preferably calculates optimum exposure and focus settings by treating the light intensity signals associated with measurement zones A and C as corresponding to the top portion of the image, and the light intensity signals associated with measurement zones B and D as corresponding to the bottom portion of the image.

Finally, if the setting unit 60 determines that the camera 1000 is not in a right orientation, the setting unit 60 then determines whether the camera 1000 is in an inverted orientation. If the camera 1000 is in an inverted orientation, the setting unit 60 preferably calculates optimum exposure and focus settings by treating the light intensity signals associated with measurement zones C and D as corresponding to the top portion of the image, and the light intensity signals associated with measurement zones A and B as corresponding to the bottom of portion the image.

Those skilled in the art will recognize that in an alternate embodiment, a different number of measurement zones may be used. Those skilled in the art will further understand how the operations described above can be modified to produce optimum exposure and focus settings in embodiments having different numbers or types of measurement zones.

Figure 4A:
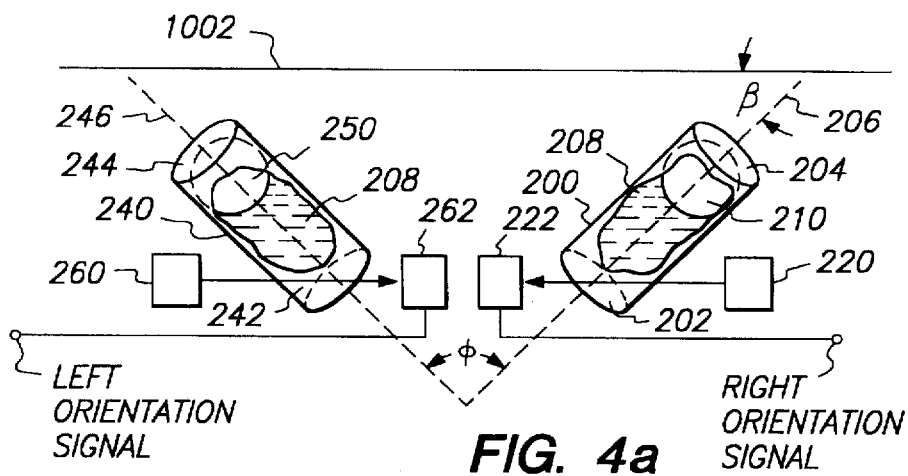
FIG. 4A is a perspective view of a second embodiment of an orientation sensor of the present invention in a normal orientation.
Figure 4B:
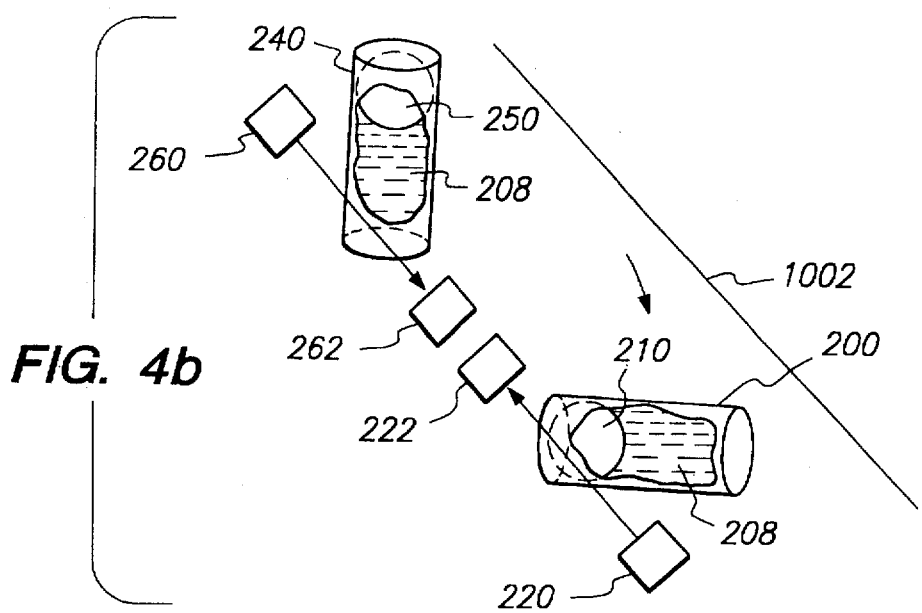
FIG. 4B is a perspective view of the orientation sensor of FIG. 4A after a clockwise rotation of the camera by an angle having a magnitude slightly greater than β degrees.

Referring now to FIGS. 4A and 4B, a perspective view of a second embodiment of the orientation sensor 30 is shown. In the second embodiment, the orientation sensor 30 comprises a first transparent tube 200 having a first end 202, a second end 204, and a longitudinal axis 206; a first light source 220; a first detector 222; a second transparent tube 240 having a first end 242, a second end 244, and a longitudinal axis 246; a second light source 260; and a second detector 262. The first transparent tube 200 and the second transparent tube 240 are both partially filled with an opaque liquid 208 that defines a first and a second bubble 210, 250 in the first and second transparent tubes 200, 240, respectively.

The longitudinal axis 206 of the first transparent tube 200 and the longitudinal axis 246 of the second transparent tube 240 each preferably lie within a plane that is parallel to the back 1006 of the camera 1000. The longitudinal axis 206 of the first transparent tube 200 is oriented at an angle β relative to the top 1002 of the camera 1000, and the longitudinal axis 246 of the second transparent tube 240 is oriented at an angle φ relative to that of the first transparent tube 200. In the preferred embodiment, β is approximately 45 degrees, and φ is approximately 90 degrees. Herein, it is assumed that the longitudinal axis 246 of the second transparent tube 240 is also oriented at an angle β relative to the top 1002 of the camera 1000. Those skilled in the art will recognize that in alternate embodiments, β and/or φ could have different values.

Each of the first and second light sources 220, 260 have an input that is electrically coupled to the orientation sensor's power input. Each of the first and second detectors 222, 262 have an output that is resistively coupled to electrical ground in an independent manner. The output of the first detector 222 forms a right orientation output of the orientation sensor 30, and is coupled to a right orientation input of the processing unit 12 via the orientation signal line 90. Similarly, the output of the second detector 262 forms a left orientation output of the orientation sensor 30, and is coupled to a left orientation input of the processing unit 12 via the orientation signal line 90.

The first and second light sources 220, 260 output a first and a second beam of light, respectively. The first light source 220 is placed proximate to the first end 202 of the first transparent tube 200, such that the first beam of light can travel through a portion of the first end 202 of the first transparent tube 200 and a portion of the first transparent tube 200 itself in the event that the first bubble 210 is present at the first transparent tube's first end 202. The first detector 222 is oriented to receive the first beam of light, where the light path between the first light source 220 and the first detector 222 is selectively interrupted by the opaque liquid 208 within the first transparent tube 200. Upon receiving the first beam of light, the first detector 222 outputs a voltage of V volts, corresponding to a binary "1" signal.

The second light source 260 is placed proximate to the first end 242 of the second transparent tube 240, such that the second beam of light can pass through a portion of the first end 242 of the second transparent tube 240 and a portion of the second transparent tube 240 itself in the event that the second bubble 250 is present at the first end 242 of the second tube 240. The second detector 262 is oriented to receive the second beam of light, where the light path between the second light source 260 and the second detector 262 is selectively interrupted by the opaque liquid 208 within second transparent tube 240. Upon receiving the second beam of light, the second detector 262 outputs a voltage of V volts, corresponding to a binary "1" signal.

For ease of understanding, it is assumed herein that the opaque liquid 208 completely attenuates the first and second beams of light, that is, neither the first nor the second beam of light can travel completely through the opaque liquid. Those skilled in the art will recognize that the present invention could function equally well with an opaque liquid 208 that only partially attenuates the first and/or second beam of light, or in an yet another embodiment an opaque ball could be used in place of the liquid.

When the camera 1000 is not rotated, that is, when the camera's top 1002 and bottom 1004 are parallel to the plane of the surface of the earth, the first and second bubbles 210, 250 are located at the second end 204 of the first transparent tube 200 and the second end 244 of the second transparent tube 240, respectively. As a result, the opaque liquid 208 prevents the first and second beams of light from reaching the first and second detectors 220, 260, respectively. Thus, when the camera is not rotated, the left and right orientation signals are equal to zero volts, corresponding to binary "0" signals.

The first and second bubbles 210, 250 remain at the second end of the first and second transparent tubes 200, 240, respectively, until the camera 1000 has been rotated by an angle having a magnitude greater than β. In the event that the camera rotation is in a clockwise direction by an angle having a magnitude just greater than β, the first bubble 210 moves from the second end 204 of the first transparent tube 200 to the first end 202 of the first transparent tube 200. This allows the first detector 222 to receive the first beam of light, and thus causes the right orientation signal to correspond to a binary "1" signal. Meanwhile, the second bubble 260 remains at the second end 242 of the second transparent tube 240, and thus the left orientation signal corresponds to a binary "0" signal. Referring now to FIG. 4B, a perspective view of the second embodiment of the orientation sensor 30 after a clockwise camera rotation slightly past an angle having a magnitude greater than β is shown to aid understanding. Upon further clockwise rotation, the right and left orientation signals continue to respectively correspond to binary "1" and "0" signals until the camera 1000 is rotated clockwise by an angle having a magnitude larger than (β+φ).

In a manner analogous to that for a clockwise rotation, in the event that the camera 1000 is rotated in a counterclockwise direction by an angle having a magnitude just greater than β, the second bubble 250 travels from the second end 242 of the second transparent tube 240 to the first end 240 of the second transparent tube 240, while the first bubble 210 remains at the second end 204 of the first transparent tube 200. Thus, for a counterclockwise camera rotation slightly past an angle having a magnitude larger than β, the left orientation signal corresponds to a binary "1" signal and the right orientation signal corresponds to a binary "0" signal. Further counterclockwise rotation does not alter the right and left orientation signals correspondence to binary "1" and "0" signals, respectively, until the camera 1000 is rotated by an angle having a magnitude larger than (β+φ).

For either clockwise or counter clockwise rotations, when the camera 1000 is rotated by an angle having a magnitude larger than (β+φ) but smaller than (β+2φ), the right and left orientation signals each correspond to binary "1" signals because both the first and second bubbles 210, 250 are located at the first ends 202, 242 of the transparent tubes 200, 240.

When the camera 1000 is rotated by an angle having a magnitude larger than (β+2φ) but smaller than (β+3φ), only one of the right and left orientation signals corresponds to a binary "1" signal. In the event that such a rotation is in a clockwise direction, the first bubble 210 moves from the first end 202 of the first transparent tube 200 to the second end 204 of the first transparent tube, while the second bubble 250 remains located at the first end 242 of the second transparent tube 240. Thus, the first detector 222 no longer receives the first beam of light while the second detector 262 continues to receive the second beam of light. Thus, for a clockwise camera rotation by an angle having a magnitude larger than (β+2φ) but smaller than (β+3φ), the right orientation signal corresponds to a binary "0" signal, and the left orientation signal corresponds to a binary "1" signal.

In a similar manner, in the event that the camera is rotated by an angle having a magnitude larger than (β+2φ) but smaller than (β+3φ), the right orientation signal corresponds to a binary "1" signal and the left orientation signal corresponds to a binary "0" signal. If the camera 1000 is rotated by an angle having a magnitude larger than (β+3φ) but not past β, the first and second bubbles 210, 250 are located at the second end 204, 244 within the first and second transparent tube 200, 240, respectively, and the right and left orientation signals each correspond to a binary "0" value.

Referring again to FIG. 6, the truth table described above with reference to the first embodiment of the orientation sensor 30 remains valid for the second embodiment of the orientation sensor 30. Therefore, the setting unit 60 determines optimum exposure and focus settings in the same manner as was described above in relation to the first embodiment of the orientation sensor 30.

Figure 5A:
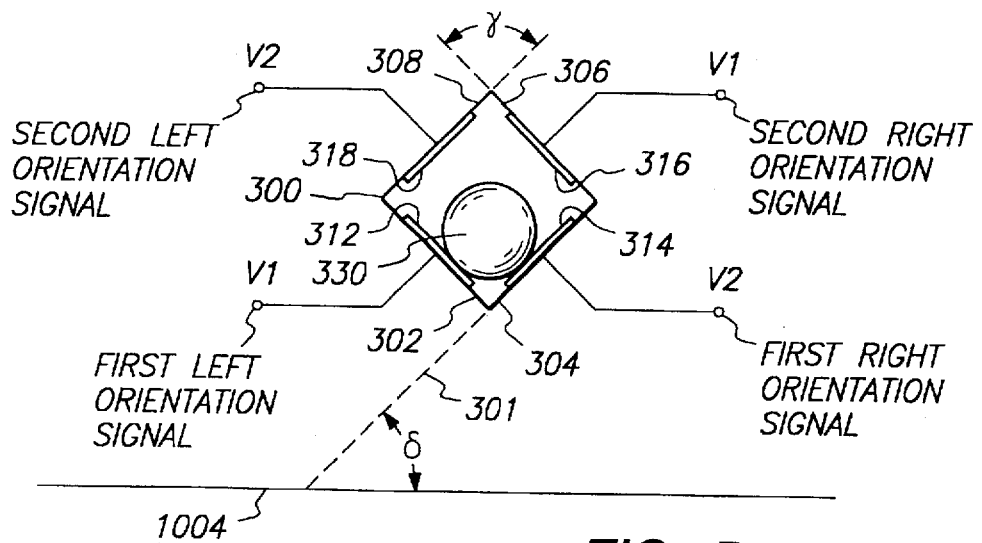
FIG. 5A is a planar-view drawing of a third embodiment of an orientation sensor of the present invention in a normal orientation.

Referring now to FIG. 5A, a planar view of a third embodiment of the orientation sensor 30 is shown. In the third embodiment, the orientation sensor 30 comprises a hollow diamond-shaped container or box 300 having a first side 302 that lies within a first plane 301, a second side 304, a third side 306, and a fourth side 308; a first, a second, a third, and a fourth electrical contact 312, 314, 316, 318; and a conducting ball 330. Each of the first, second, third, and fourth electrical contacts 312, 314, 316, 318 are slightly shorter than the first, second, third, and fourth sides 302, 304, 306, 308, respectively, of the diamond-shaped box 300. The first electrical contact 312 is placed upon the interior of the first side 302 of the diamond-shaped box 300, and the second electrical contact 314 is placed upon the interior of the second side 304 of the diamond-shaped box 300 such that the first and second electrical contacts 312, 314 are electrically isolated from each other. Similarly, the third electrical contact 316 is placed upon the interior of the third side 304 of the diamond-shaped box 300, such that the second and third electrical contacts 314, 316 are electrically isolated from each other. Finally, the fourth electrical contact 318 is placed upon the interior of the fourth side 308 of the diamond-shaped box 300 in such a manner that the first, third, and fourth electrical contacts 312, 316, 318 are each electrically isolated from one another.

The first and third electrical contacts 312, 316, are each resistively coupled to the orientation sensor's power input in an independent manner to provide a voltage V1. The second and fourth electrical contacts 314, 318, are each resistively coupled to the orientation sensor's power input in an independent manner to provide a voltage V2, where V2 preferably equals −V1. The first, second, third, and fourth electrical contacts 312, 314, 316, 318 additionally form a first left orientation output 320, a first right orientation output 330, a second right orientation output 332, and a second left orientation output 322, respectively, of the orientation sensor 30. The first left orientation output provides a first left orientation signal to a first left orientation input of the processing unit 12 via the orientation signal line 90. Similarly, the second left orientation output, the first right orientation output, and the second right orientation output provide a second left orientation signal, a first right orientation signal, and a second right orientation signal to a second left orientation input, a first right orientation input, and a second right orientation input of the processing unit 12, respectively, via the orientation signal line 90.

The first plane 301 containing the first side 302 of the diamond-shaped box 300 is oriented at an angle of δ relative to the bottom 1004 of the camera 1000. In the preferred embodiment, δ equals 45 degrees. The first and second sides 302, 304, are oriented at an angle γ relative to each other. In the preferred embodiment, γ equals 90 degrees, and therefore each of the first, second, third, and fourth sides 302, 304, 306, 308 are oriented at an angle of 90 degrees relative to each adjacent side. Those skilled in the art will recognize that in an alternate embodiment, γ could have a different value, and that in general, the relative side-to-side orientations within the diamond-shaped box 300 are constrained such that the sum of the angles between each pair of adjacent sides equals 360 degrees. The diamond-shaped box 300 additionally has a face (not shown) that is perpendicular to each of its first, second, third, and fourth sides 302, 304, 306, 308 and parallel to the back 1006 of the camera.

When the camera 1000 is not rotated, that is, when both the top 1002 and bottom 1004 of the camera are parallel to the plane of the surface of the earth, the conducting ball 330 simultaneously rests upon the first electrical contact 312 and the second electrical contact 314, thereby providing a current path between the first and second electrical contacts 312, 314. Thus, the first left orientation signal and the first right orientation signal are equal to each other while being unequal to the second left orientation signal or the second right orientation signal when the camera is not rotated.

Figure 5B:
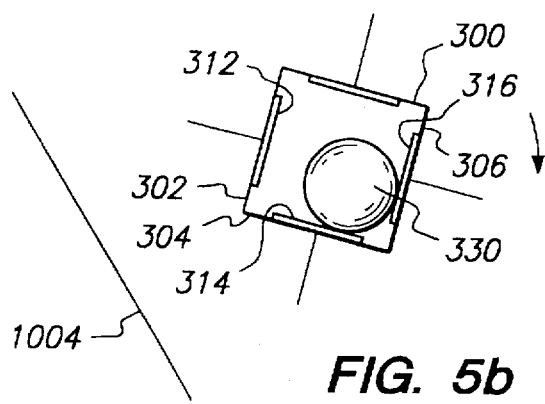
FIG. 5B is a planar-view drawing of the orientation sensor of FIG. 5A after a clockwise rotation of the camera over an angle having a magnitude slightly greater than γ degrees.

When the camera 1000 is rotated in a clockwise direction just past an angle having a magnitude of δ degrees, the conducting ball 330 simultaneously rests upon the second and third electrical contacts 314, 316. Referring now to FIG. 5B, is a planar-view drawing of the third embodiment of the orientation sensor 30 after a clockwise rotation over an angle having a magnitude slightly greater than δ degrees is shown to aid understanding. In this case, the first right orientation signal and the second right orientation signal are equal to each other while being unequal to either of the first left or second left orientation signals. The second and third right orientation signals continue to remain equal to each other while the clockwise rotation angle of the camera 1000 is greater than δ but less than (δ+γ) degrees. Because γ preferably equals 90 degrees, thereby constraining the angle between each adjacent pair of sides to equal 90 degrees, the number 90 will appear instead of the symbol γ in the description that follows.

Once the camera 1000 is rotated in a clockwise direction slightly past an angle having a magnitude of (δ+90) but less than (δ+180) degrees, the conducting ball 330 will simultaneously rest upon the third and fourth electrical contacts 316, 318, thereby making the third and fourth orientation signals equal. In the event that the camera 1000 is rotated in a clockwise direction just past an angle having a magnitude of (δ+180) degrees but less than (δ+270) degrees, the conducting ball 330 will simultaneously rest upon the first and fourth electrical contacts 312, 318, thereby making the first and fourth orientation signals equal.

The setting unit 60 determines which pair of orientation signals are equal to determine the orientation of the camera 1000. Referring now to FIG. 7, a table of orientation signal equality conditions and corresponding camera orientations is shown. As shown in FIG. 7, when the first left orientation signal equals the first right orientation signal, the camera 1000 is in an upright orientation. When the first and second right orientation signals are equal, the camera 1000 is in a right orientation. Similarly, when the first and second left orientation signals are equal, the camera 1000 is in a left orientation. Finally, when the second left orientation signal equals the second right orientation signal, the camera is in an inverted orientation. Upon determining the camera's orientation, the setting unit 60 determines the optimum exposure and focus settings in the manner described above.

Figure 8:
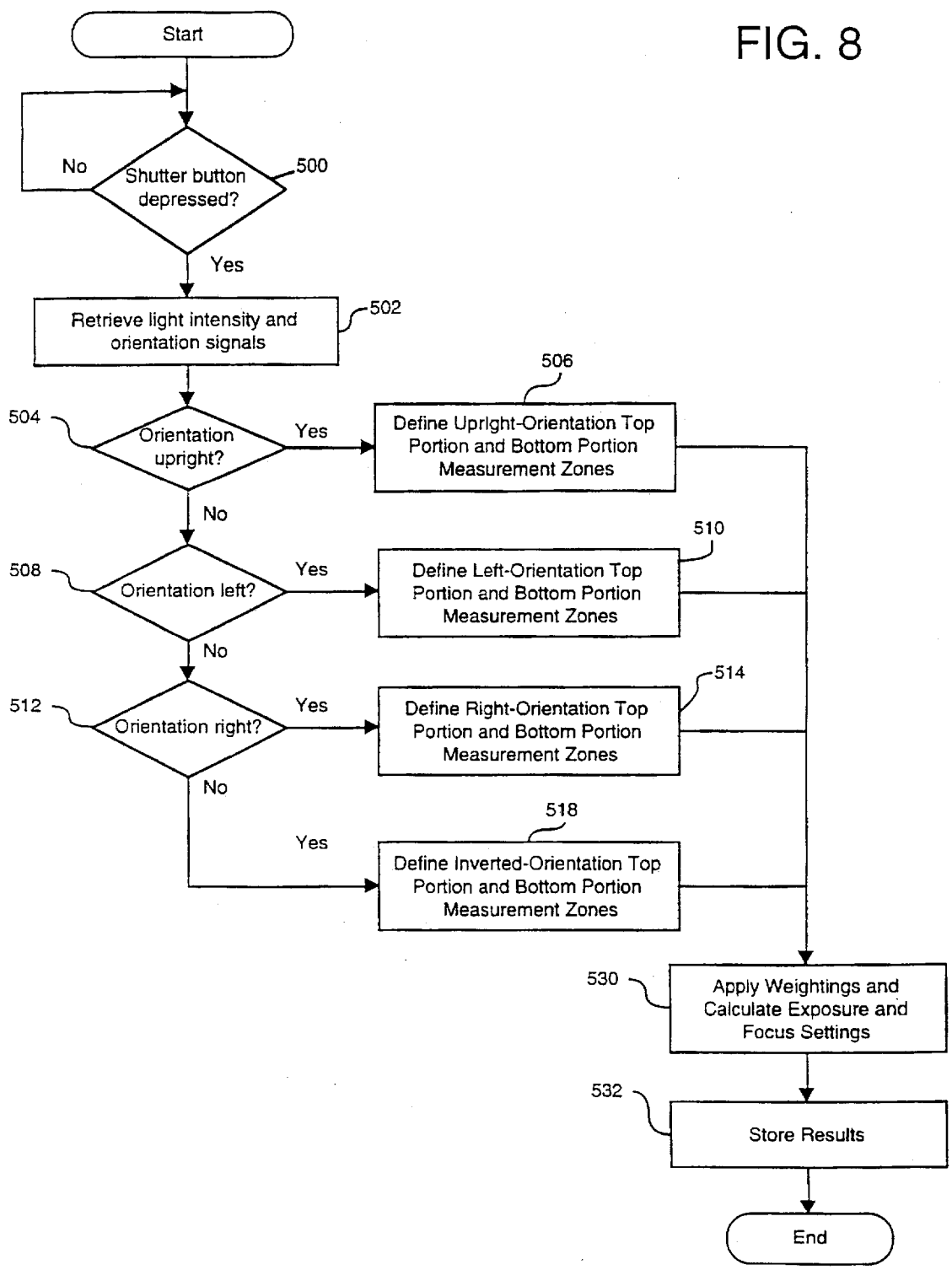
FIG. 8 is a flowchart of a preferred method for orientation-dependent camera exposure setting adjustment in accordance with the present invention.

Referring now to FIG. 8, a flowchart of a preferred method for orientation-dependent camera exposure and focus setting optimization in a camera having four measurement zones as defined in FIG. 9A is shown. The preferred method begins in step 500 with the processing unit 12 determining whether the shutter button 1010 has been depressed. Preferably, the processing unit 12 determines that the shutter button 1010 has been depressed by monitoring the value of the shutter activation signal. If the shutter button has not been depressed, the preferred method remains at step 500. In the event that the shutter button 1010 has been depressed, the setting unit 60 next retrieves the light intensity signals and the left and right orientation signals from the image memory 50 in step 502. After step 502, the setting unit 60 determines whether the camera 1000 is in an upright orientation in step 504. If the camera 1000 is in an upright orientation, the setting unit 60 defines measurement zones A and B as corresponding to the top portion of the image, and measurement zones C and D as corresponding to the bottom portion of the image in step 506.

If the setting unit 60 determines in step 504 that the camera 1000 is not in an upright orientation, the setting unit 60 next determines whether the camera 1000 is in a left orientation in step 508. If the camera 1000 is in a left orientation, the setting unit 60 defines measurement zones B and D as corresponding to the top portion of the image, and measurement zones A and C as corresponding to the bottom portion of the image in step 508.

If the setting unit 60 determines in step 508 that the camera 1000 is not in a left orientation, the setting unit 60 next determines whether the camera 1000 is in a right orientation in step 512. If the camera 1000 is in a right orientation, the setting unit 60 defines measurement zones A and C as corresponding to the top portion of the image, and measurement zones B and D as corresponding to the bottom portion of the image in step 514.

If the setting unit 60 determines in step 512 that the camera 1000 is not in a right orientation, the setting unit 60 next defines measurement zones C and D as corresponding to the top portion of the image, and measurement zones A and B as corresponding to the bottom portion of the image in step 518. Those skilled in the art will recognize that this corresponds to an inverted camera orientation.

After each of steps 506, 510, 514, and 518, the setting unit 60 weights those light intensity signals corresponding to measurement zones that were determined to be associated with the top portion of the image in a first predetermined manner, and weights the light intensity signals corresponding to measurement zones that were determined to be associated with the bottom portion of the image in a second predetermined manner to calculate optimum exposure and focus settings in step 530. The setting unit 60 next stores the calculated optimum exposure and focus settings in the memory in step 532, after which the preferred method ends.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. An apparatus for producing signals to optimize settings of an imaging device with a top, a bottom, a back and a front to compensate for an orientation of the imaging device, the apparatus comprising:

a light sensor, having an input and an output, for measuring the intensity of an image at a selected measurement zone and outputting a light intensity signal proportional to incident light intensity in the measurement zone, the input of the light sensor coupled to the imaging device;

an orientation sensor having an output for producing an orientation signal indicating the orientation of the imaging device, the orientation sensor including a first tube having a first end, a second end and a longitudinal axis, the longitudinal axis of the first tube positioned in a plane substantially parallel to the back of the imaging device and at a first predetermined angle relative to the plane containing the bottom of the imaging device; a second tube having a first end, a second end and a longitudinal axis, the longitudinal axis of the second tube positioned in a plane substantially parallel to the back of the imaging device and at a second predetermined angle relative to the longitudinal axis of the first tube; a first indicating object positioned within the first tube; a second indicating object positioned within the second tube;

a first light source for producing a beam of light, the first light source positioned proximate the first end of the first tube such that the light beam is directed through the first tube;

a first detector having an optical input and an output, the first detector positioned proximate the first end of the first tube to receive the beam of light from the first light source at its optical input and produce an orientation output signal if the light beam is present;

a second light source for producing a light beam, the second light source positioned proximate the first end of the second tube such that the light beam is directed through the second tube; and a second detector having an optical input and an output, the second detector positioned proximate the first end of the second tube to receive the light beam from the second light source at its optical input and produce a second orientation output signal if the light beam is present, the output of the second detector coupled to the setting unit, whereby an upright orientation, a right orientation, a left orientation and an inverted orientation may be determined by the orientation sensor; and a setting unit having a first input, a second input and an output for determining optimum exposure and focus settings for the imaging device, the first input of the setting unit coupled to the output of the light sensor, the second input of the setting unit coupled to the output of the orientation sensor, and the output of the setting unit coupled to control the exposure and focus of the imaging device.

2. The apparatus of claim 1, wherein the orientation sensor further comprises:

a substantially opaque liquid disposed in the first and second tubes; and wherein the first and second indicating objects are first and second bubbles formed within the first and second tubes.

* * * * *

UNITED STATES PATENT AND TRADEMARK OFFICE
CERTIFICATE OF CORRECTION

PATENT NO.   : 5,764,291
DATED        : Jun. 9, 1998
INVENTOR(S)  : Scott F. Fullam It is certified that error appears in the above-identified patent and that said Letters Patent is hereby corrected as shown below:

On title page, item [73], Assignee: should read --Flashpoint Technology, Inc., San Jose, Calif.--

Signed and Sealed this

Eighth Day of June, 1999

*Attest:*

Q. TODD DICKINSON

*Attesting Officer*   Acting Commissioner of Patents and Trademarks